(12) United States Patent
Nakagawa et al.

(10) Patent No.: US 9,201,137 B2
(45) Date of Patent: Dec. 1, 2015

(54) TARGET OBJECT DETECTION DEVICE, TARGET OBJECT DETECTING METHOD, COMPUTER READABLE MEDIA STORING TARGET OBJECT DETECTING PROGRAM, AND RADAR APPARATUS

(71) Applicant: Furuno Electric Co., Ltd., Nishinomiya (JP)

(72) Inventors: Kazuya Nakagawa, Kobe (JP); Koji Nishiyama, Nishinomiya (JP); Akira Okunishi, Kobe (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 270 days.

(21) Appl. No.: 13/902,505

(22) Filed: May 24, 2013

(65) Prior Publication Data

US 2013/0314274 A1    Nov. 28, 2013

(30) Foreign Application Priority Data

May 25, 2012 (JP) .................................. 2012-119461

(51) Int. Cl.
*G01S 7/35* (2006.01)
*G01S 7/292* (2006.01)
*G01S 13/42* (2006.01)
*G01S 13/93* (2006.01)

(52) U.S. Cl.
CPC ............... *G01S 7/354* (2013.01); *G01S 7/2926* (2013.01); *G01S 13/426* (2013.01); *G01S 13/9307* (2013.01)

(58) Field of Classification Search
CPC . G01S 13/426; G01S 13/9307; G01S 7/2926; G01S 7/354
USPC .......................................................... 342/90
See application file for complete search history.

(56) References Cited

U.S. PATENT DOCUMENTS

2010/0207806 A1* 8/2010 Takahashi ............. G01S 13/106
                                                           342/109
2013/0314273 A1* 11/2013 Kavaler ................. G01S 13/886
                                                           342/90

FOREIGN PATENT DOCUMENTS

JP          2004191144 A        7/2004

* cited by examiner

*Primary Examiner* — Timothy A Brainard
(74) *Attorney, Agent, or Firm* — Alleman Hall McCoy Russell & Tuttle LLP

(57) ABSTRACT

A target object detection device is provided. The device includes an antenna unit for transmitting a detection signal in an observing direction at a predetermined detection cycle and receiving a reflection signal of the detection signal, a receiver for outputting reception data obtained by sampling the reception signal that is received by the antenna unit, a detection data generator for outputting detection data obtained by correlating current reception data with previous detection data, and a detection cycle adjuster for adjusting the detection cycle based on the detection data.

12 Claims, 11 Drawing Sheets

US 9,201,137 B2

TARGET OBJECT DETECTION DEVICE, TARGET OBJECT DETECTING METHOD, COMPUTER READABLE MEDIA STORING TARGET OBJECT DETECTING PROGRAM, AND RADAR APPARATUS

CROSS-REFERENCE TO RELATED APPLICATION(S)

The application claims priority under 35 U.S.C. §119 to Japanese Patent Application No. 2012-119461, which was filed on May 25, 2012 the entire disclosure of which is hereby incorporated by reference.

TECHNICAL FIELD

The present invention relates to a target object detection device for detecting a target object in a detection area.

BACKGROUND OF THE INVENTION

Conventionally, target object detection devices have been provided, in which target object detection processing, such as generation of a detection image, is executed by transmitting detection signals to a detection area, and receiving echo signals (reflection signals) of target object(s). In such target object detection devices, in addition to the echo signals of the target object(s), echo signals of clutter (reflections from sea surface, rain, etc.) may be received. Since such echo signals of the clutter cause difficulty in distinguishing the echo signal of the target object, it is desired to be suppressed.

Therefore, various methods of suppressing clutter have been devised, for example, JP3775383B discloses a multi-beam radar apparatus provided with a clutter suppressing function.

A clutter that is particularly caused by reflection from a sea surface is called a sea clutter. Suppression of the sea clutter is generally performed by acquiring echo data of a target position for a plurality of times at a predetermined time interval, and performing processing of averaging data levels of the plurality of echo data. Hereinafter, such processing is referred to as a scan correlation. By performing such processing, the echo signal of the sea clutter where high data levels seldom exist at the same position continuously in a time axis is suppressed.

However, in the conventional scan correlation, when the acquisition cycle of the echo data of the target position matches with the cycle that the sea clutter is observed at the target position at a high level, the level of data of the target position after the scan correlation will be maintained high. In such a case, sufficient clutter suppression effect cannot be obtained from the conventional scan correlation.

For example, with a radar apparatus for ships, when a cycle that a crest of a wave appears at the target position matches with the acquisition cycle of the echo data, the level of data of the target position becomes continuously high. In this case, the level of the echo signal will not be suppressed even if the scan correlation is performed, and thus, the echo signals remain as sea clutter on a detection display screen. Thus, with the conventional scan correlation, the echo signal level may not be sufficiently suppressed depending on the behavior of the sea clutter.

SUMMARY OF THE INVENTION

The present invention is made in view of the above situation, and it provides a target detection device that can prevent a suppression effect of a sea clutter from weakening due to a behavior of the sea clutter.

According to an aspect of the invention, a target object detection device is provided. The device includes an antenna unit, a receiver, a detection data generator, and a detection cycle adjuster. The antenna unit transmits a detection signal in an observing direction at a predetermined detection cycle and receives a reflection signal of the detection signal. The receiver outputs reception data obtained by sampling the reception signal that is received by the antenna unit. The detection data generator outputs detection data obtained by correlating current reception data with previous detection data. The detection cycle adjuster adjusts the detection cycle based on the detection data.

In this configuration, by the detection cycle adjuster adjusting, the transmission timing of the detection signal in the observing direction is adjusted for every scan. In this manner, the detection cycle of an observing position can be different from a cycle that a high level component of the sea clutter is observed at the observing position at a high level.

The detection cycle adjuster may adjust the detection cycle based on a comparison between first detection data obtained by transmitting the detection signal at a first detection cycle, and second detection data obtained by transmitting the detection signal at a second detection cycle that is different from the first detection cycle.

In this configuration, with respect to sea clutter in the same state, by using that the echo value is different between the first and second detection data acquired at different cycles and correlated, and the first and second detection data are compared to each other to adjust the detection cycle.

The antenna unit may include a single rotary antenna for transmitting the detection signals while rotating its directivity axis at a predetermined rotation cycle, the detection signal being transmitted in a direction of the directivity axis. The detection cycle adjuster may adjust the detection cycle by adjusting the rotation cycle of the rotary antenna.

In this configuration, specifically, a case where the antenna unit includes a single rotary antenna, and the detection cycle is adjusted by adjusting the rotational cycle of the rotary antenna, is shown.

The antenna unit may include first and second rotary antennas for transmitting the detection signals while rotating their directivity axes at the same rotation cycle, the detection signal being transmitted in a direction of the directivity axis. The detection data generator may generate the detection data based on the reception data from the first and second antennas. The detection cycle adjuster may adjust the detection cycle by adjusting an angular difference between the directivity axis of the first antenna and the directivity axis of the second antenna based on the detection data.

In this configuration, a case is shown where the antenna unit includes two rotary antennas, and the detection cycle is adjusted by adjusting the angular difference between the directivity axes of the two rotary antennas.

The detection cycle adjuster may calculate an average value of the detection data of a predetermined area containing an observing position for a first detection cycle and a second detection cycle, respectively, and the detection cycle adjuster may adjust the detection cycle based on a difference between an average value of the first detection cycle and an average value of the second detection cycle.

In this configuration, a further specific method for adjusting the detection cycle is shown. The echo data value of, for example, a target object, is kept at a high level that will not be suppressed regardless of the detection cycle. However, if the correlation is effective, the echo data value of the sea clutter will be suppressed, and if the correlation is not effective, the echo data value of the sea clutter will not be suppressed and become high level. Therefore, the average value of the echo data values within an area having a predetermined size may change depending on whether the sea clutter is suppressed. In this manner, the detection cycle is determined by using the difference between the average value of the first detection cycle and the average value of the second detection cycle which is different from the first detection cycle, and thus, a detection cycle with high sea clutter suppressing effect can be set.

The detection cycle adjuster may detect a target object based on values of the detection data, and when the target object is within the predetermined area, the detection cycle adjuster may adjust the detection cycle based on values of the detection data of the predetermined area other than a target object area having a predetermined size containing the target object.

In this configuration, the target object is detected, and the area including the target object is removed from the predetermined area for calculating the average value. In this manner, the average value depends only on the sea clutter, and thus, the sea clutter suppressing effect can be determined further accurately.

According to another aspect of the invention, a radar apparatus is provided. The radar apparatus includes the target object detection device of the other aspect, the detection signal being a radio wave signal.

In this configuration, as one example of the target object detection device, a radar apparatus is realized by using the detection signal of the radio wave.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

A target object detection device according to a first embodiment of the present invention is described with reference to the appended drawings. Note that, in this embodiment, a radar apparatus for transmitting radio waves as detection signals and receiving the reflection signals of the detection signals to detect a target object is described as one example of the target object detection device. However, even without the radio waves, other target object detection devices for transmitting detection signals to an observing position at a predetermined detection cycle and using the reflection signals of the detection signals to detect a target object can be applied with the configuration and processing of this embodiment.

Figure 1:
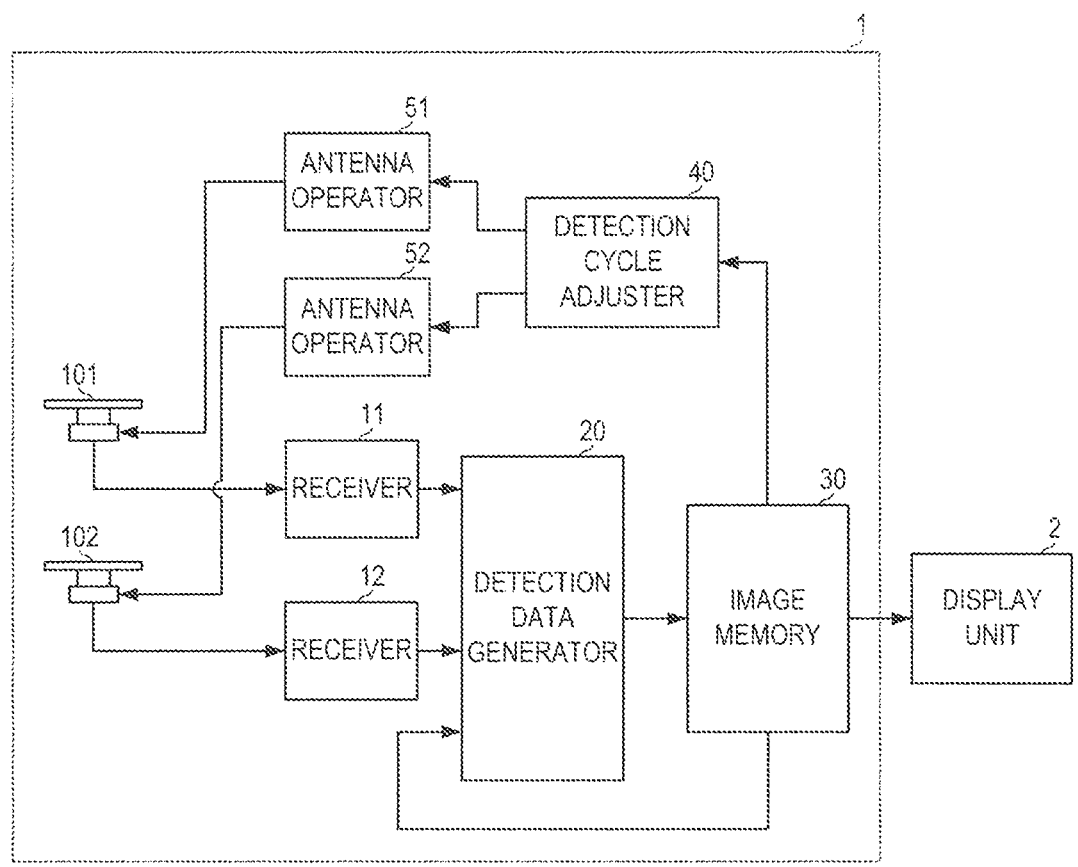
FIG. 1 is a block diagram showing a configuration of a radar apparatus 1 according to a first embodiment of the invention.
Figure 2A:
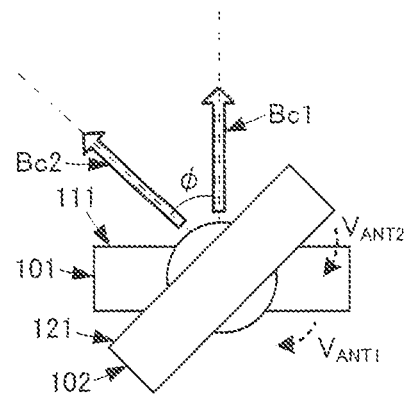
FIG. 2A is a view of an installation mode of a first antenna 101 and a second antenna 102.
Figure 2B:
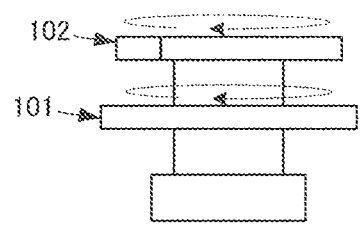
FIG. 2B is a view of an operation mode of the first antenna 101 and the second antenna 102.

FIG. 1 is a block diagram showing a configuration of a radar apparatus 1 according to this embodiment. FIG. 2A is a view of an installation mode of a first antenna 101 and a second antenna 102, and FIG. 2B is a view of an operation mode of the first antenna 101 and the second antenna 102.

The radar apparatus 1 includes the first antenna 101, the second antenna 102, a first receiver 11, a second receiver 12, a detection data generator 20, an image memory 30, a detection cycle adjuster 40, a first antenna operator 51, and a second antenna operator 52.

The first antenna 101 is supplied with a first detection pulse signal from a transmission signal generator (not illustrated). The second antenna 102 is supplied with a second detection pulse signal from a transmission signal generator (not illustrated). For example, a pulse width, a pulse height, and a pulse transmission cycle $T_p$ are set to be the same between the first and second detection pulse signals. Note that, these parameters may be different between the first and second detection pulse signals. Each of the first and second detection pulse signals corresponds to the "detection signal" in the claims.

The first antenna 101 has a long rectangular housing. One side face of the housing is a wave transceiving face 111. A directivity axis Bc1 of the first antenna 101 is oriented in a direction orthogonal to the wave transceiving face 111.

The first antenna 101 transmits the first detection pulse signal with a directivity having a predetermined spatial spread with respect to the directivity axis Bc1 from a substantially central position of the wave transceiving face 111. The first antenna 101 rotates so that the directivity axis Bc1 sequentially points all circumferential directions of the first antenna 101. The first antenna 101 is controlled to rotate at a predetermined rotational speed $V_{ANT1}$ by the first antenna operator 51. The first antenna 101 transmits the first detection pulse signal at the pulse transmission cycle $T_p$ shorter than a detection cycle $T_{ANT1}$ based on the rotational speed $V_{ANT1}$ while rotating.

The first antenna 101 receives, as a reception signal, a reflection signal obtained by the first detection pulse signal reflecting on a target object, clutter, etc.

The second antenna 102 has a long rectangular housing similar to the first antenna 101. One side face of the housing is a wave transceiving face 121. A directivity axis Bc2 of the second antenna 102 is oriented in a direction orthogonal to the wave transceiving face 121.

The second antenna 102 transmits the second detection pulse signal with a directivity having a predetermined spatial spread with respect to the directivity axis Bc2 from a substantially central position of the wave transceiving face 121. The second antenna 102 rotates so that the directivity axis Bc2 sequentially points all circumferential directions of the second antenna 102. The second antenna 102 is controlled to rotate at a predetermined rotational speed $V_{ANT2}$ by the second antenna operator 52. The second antenna 102 transmits the second detection pulse signal at the pulse transmission cycle Tp shorter than a detection cycle $T_{ANT2}$ based on the rotational speed $V_{ANT2}$ while rotating.

The second antenna 102 receives, as a reception signal, a reflection signal obtained by the second detection pulse signal reflecting on a target object, clutter, etc.

The first and second antennas 101 and 102 are arranged to have substantially matched rotational axes with each other. For example, as shown in FIGS. 2A and 2B, the first and second antennas 101 and 102 are arranged to align in a vertical direction.

The first and second antennas 101 and 102 are arranged so that the directivity axis Bc1 of the first antenna 101 and the directivity axis Bc2 of the second antenna 102 have an angular difference ø[°] therebetween.

With such a configuration, the second detection signal is transmitted in an observing azimuth by the second antenna 102 at a time interval from a timing at which the first detection signal is transmitted to the observing azimuth by the first antenna 101, the time interval corresponding to the angular difference ø[°]. Therefore, the detection signal can be transmitted in the observing azimuth at a shorter cycle than the transmission cycle of a single antenna (e.g., only the first antenna 101, or only the second antenna 102). In this manner, the time interval of the scan correlation can be shortened. In other words, the number of performances of the scan correlation per unit time can be increased.

Further, the transmission interval of the detection signal in the observing azimuth can be adjusted by adjusting the angular difference ø. This specific method of adjusting the angular difference ø is described later.

The first receiver 11 receives the reception signal (reflection signal) from the first antenna 101, amplifies the reception signal and discretizes it at a predetermined digital sampling interval, so as to generate echo data. Here, the first receiver 11 collates echo data for every reception signal obtained from a single transmission of the detection pulse signal, and outputs it as sweep data. Specifically, the sweep data is configured of a plurality of echo data aligned in a distance direction (in a time axis) which is obtained from a single transmission of the detection pulse signal. The first receiver 11 outputs the sweep data to the detection data generator 20.

The second receiver 12 receives the reception signal (reflection signal) from the second antenna 102, amplifies the reception signal and discretizes it at a predetermined digital sampling interval, so as to generate echo data. Here, the second receiver 12 collates echo data for every reception signal obtained from a single transmission of the detection pulse signal, and outputs it as sweep data. The second receiver 12 outputs the sweep data to the detection data generator 20.

The detection data generator 20 performs a scan correlation using the echo data of the sweep data inputted sequentially from the first and second receivers 11 and 12, and detection data which is obtained from a previously performed scan correlation and is stored in the image memory 30. Thus, the detection data generator 20 generates current detection data.

The scan correlation indicates the following processing. X[n] is an echo data value of the observing position among current sweep data. Y[n−1] is a detection data value of the observing position obtained from the previous scan correlation. Y[n] is a detection data value of the observing position calculated in the current scan correlation. α and β are weighting coefficients and, for example, they are set to satisfy 0<α<1 and β=1−α. The values of α and β can be suitably set according to the exertion level of the effect of the scan correlation.

$$Y[n]=\alpha \times X[n]+\beta \times Y[n-1] \quad (1)$$

When such processing is performed, with the configuration of this embodiment, the echo data (sweep data) X[n] obtained at a timing n of acquisition by the first antenna 101 in a certain scan (single rotation of the antenna) uses the detection data value Y[n−1] which is previously scan-correlated, and the detection data value Y[n−1] is a scan correlation result using the echo data (sweep data) X[n−1] obtained by the second antenna 102 at the acquisition timing n−1 in an immediate previous scan to the certain scan. The echo data (sweep data) X[n+1] obtained at a timing n+1 of acquisition by the second antenna 102 in the certain scan uses the detection data value Y[n] previously scan-correlated thereto, and the detection data value Y[n] is obtained from a scan correlation result using the echo data (sweep data) X[n] obtained by the first antenna 101 at a timing before the certain scan by a time length corresponding to the angular difference ø.

As above, the detection data generator 20 of this embodiment performs the scan correlation on the echo data obtained by the first antenna 101 and the echo data obtained by the second antenna 102 sequentially which are inputted alternately.

The detection data generator 20 outputs the scan-correlated detection data to the image memory 30.

The image memory 30 is a memory that can store the detection data of an area within a predetermined distance in all directions. The image memory 30 stores the scan-correlated detection data to an address corresponding to a pixel position of the detection data. The image memory 30 is structured to store data of a predetermined number of bits in each address, and stores a value indicating a level of each detection data (corresponding to an amplitude strength of the echo signal).

The detection data stored in the image memory 30 is read out by the display unit 2. The display unit 2 sets, for example, a gradation and color based on the read detection data value, and displays a detection image.

The detection cycle adjuster 40 reads out the detection data from the image memory 30 and adjusts the value of the angular difference ø corresponding to a transmission timing difference between the first and second antennas 101 and 102. The detection cycle adjuster 40 outputs a rotational speed adjusting signal according to the adjusted angular difference ø to the first and second antenna operators 51 and 52.

The first and second antenna operators 51 and 52 adjust the rotational speed $V_{ANT1}$ and $V_{ANT2}$ based on the rotational speed adjusting signal. Thus, the angular difference ø between the directivity axis Bc1 of the first antenna 101 and the directivity axis Bc2 of the second antenna 102 is adjusted.

Figure 3:
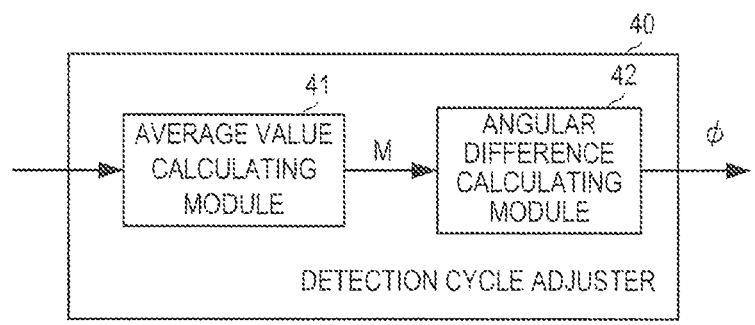
FIG. 3 is a block diagram showing a configuration of a detection cycle adjuster 40 of the apparatus 1.
Figure 4:
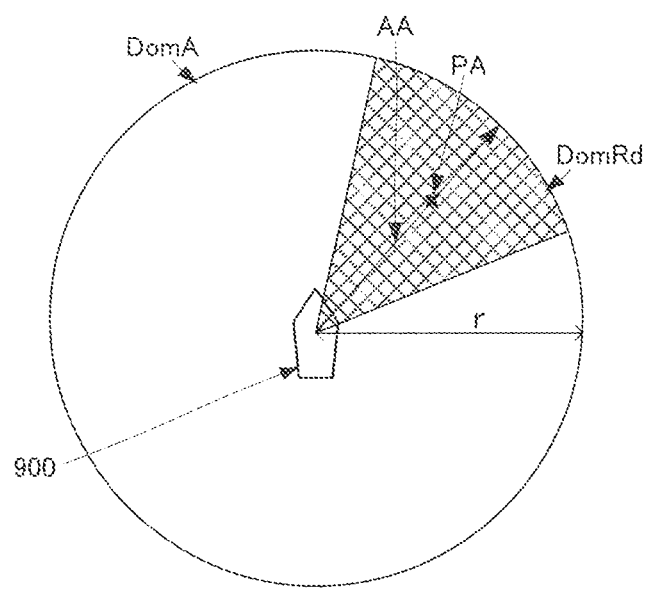
FIG. 4 is a view showing a concept for calculating an average value according to the first embodiment.

FIG. 3 is a block diagram showing a configuration of the detection cycle adjuster 40. The detection cycle adjuster 40 includes an average value calculating module 41 and an angular difference calculating module 42. The average value calculating module 41 calculates an average value of the detection data values in a predetermined area including an observing azimuth AA in which an observing position PA exits. FIG. 4 is a view showing a concept for calculating the average value.

The radar apparatus 1 is equipped in a ship 900, and the first and second antennas 101 and 102 transmit the first and second detection pulse signals while rotating in the horizontal plane, respectively. Here, a circular area DomA having a radius r centering on the ship 900 is set. Moreover, an area DomRd corresponding to a predetermined azimuth range including the observing azimuth AA in which the observing position PA exits is set in the area DomA extending around the entire circumference. Note that, this setting of the area DomRd is merely an example and may suitably be set. The area DomA may be a target area for calculating the average value.

The average value calculating module 41 calculates an average value M of the detection data values relevant to the area DomRd. The average value calculating module 41 calculates the average value M at a predetermined timing interval. For example, the average value calculating module 41 calculates the average value M every time one of the antennas crosses a predetermined azimuth in the area DomRd. Moreover, the average value calculating module 41 calculates the average value M every time the stored detection data corresponding to the entire area DomRd is updated, for example.

When a current average value is inputted from the average value calculating module 41 to the angular difference calculating module 42, the angular difference calculating module 42 compares it with a previous average value obtained at a previous average value calculating timing to adjust the angular difference ø.

Specifically, for example, the angular difference calculating module 42 uses a current average value M(n) and a previous average value M(n−1) to set the angular difference ø by the following processing. Note that, the following processing is merely an example, and other methods in which the angular difference ø is set by using the current average value M(n) and the previous average value M(n−1) to reduce the average value M can also be used.

When the current average value M(n) is smaller than the previous average value M(n−1), the angular difference calculating module 42 sets an angle correction value Δø to 2Δø. Moreover, the angular difference calculating module 42 adds the angular difference Δø(=2Δø) to an angular difference ø(n−1) set in a previous setting [n−1] and set the result as a current angular difference ø[n]. Here, the angular difference calculating module 42 stores the previous angular difference ø(n−1) as a temporary angular difference $ø_{TMP}$.

When the current average value M(n) is larger than the previous average value M(n−1), the angular difference calculating module 42 sets the angle correction value Δø to (½)Δø. Moreover, the angular difference calculating module 42 adds the angular difference Δø(=(½)Δø) to the temporary angular difference $ø_{TMP}$ and set the result as the current angular difference ø[n].

Specifically, the angular difference calculating module 42 performs processing satisfying the following equations.

Figure 5:
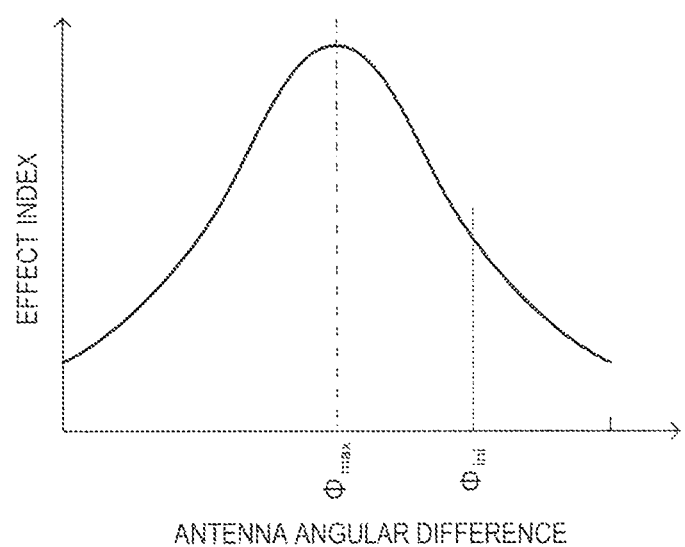
FIG. 5 is a chart showing a concept of adaptation of an angular difference ø.

If $M(n) < M(n-1)$, then $\Delta ø = 2\Delta ø$ $ø(n) = ø(n-1) + \Delta ø$ $ø_{TMP} ø(n-1)$ else $\Delta ø = (½)\Delta ø$ $ø(n) = ø_{TMP} + \Delta ø$ By performing such processing, the angular difference ø is set so that the effect of the scan correlation improves, in other words, the suppression effect of sea clutter improves. FIG. 5 is a chart showing a concept of adaptation of the angular difference ø. The vertical axis of FIG. 5 indicates an effect index of the scan correlation, which is set using the inverse of the average value, for example. The horizontal axis of FIG. 5 indicates the angular difference, in which the angular difference with a highest effect index of the scan correlation (maximum effect angular difference) is $ø_{max}$, and an initial angular difference is $ø_{ini}$. Note that, in FIG. 5, the example with an excessively large initial angular difference $ø_{ini}$ is shown; however, the angular difference ø can be similarly adapted also when the initial angular difference $ø_{ini}$ is excessively small.

In the case where the above described processing is performed, when the current average value M(n) is smaller than the previous average value M(n−1), the effect index is considered to be higher with the current angular difference ø(n) than the previous angular difference ø(n−1). In other words, it is indicated that echoes of sea clutter are suppressed more effectively. Therefore, the angular difference ø is further corrected greatly to be closer to the maximum effect angular difference $ø_{max}$.

On the other hand, when the current average value M(n) is larger than the previous average value M(n−1), the effect index is considered to be lower with the current angular difference ø(n) than the previous angular difference ø(n−1), or constant. In other words, it is indicated that the echoes of the sea clutter are not suppressed effectively. Therefore, if the angular difference ø is further greatly corrected, it will leave further away from the maximum effect angular difference $ø_{max}$, and the suppression effect of the sea clutter degrades. Thus, by a slight correction of the angular difference on the temporary angular difference $ø_{TMP}$ which is the previous angular difference, the effect index can be prevented from decreasing.

By using the setting method of the angular difference ø of this embodiment as described above, the angular difference ø between the first and second antennas 101 and 102 can be set to the maximum effect angular difference $ø_{max}$ with which the sea clutter suppression effect is maximally exerted.

In this manner, the echoes of the sea clutter can be effectively suppressed without being influenced by the behavior of the sea clutter.

Figure 6:
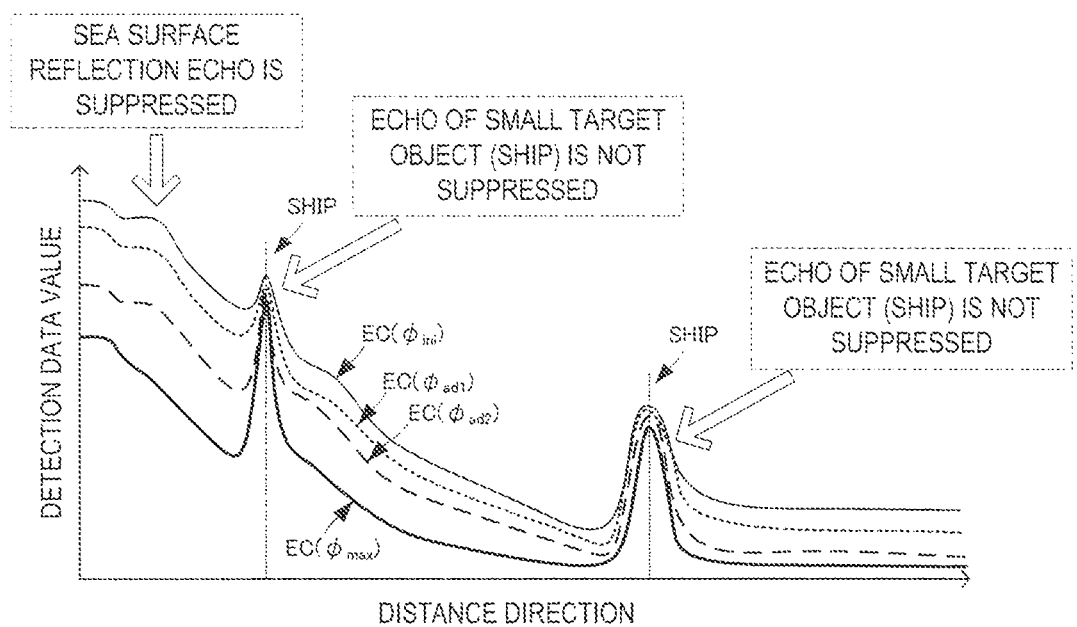
FIG. 6 is a chart showing a state where a sea clutter suppression effect obtained when the radar apparatus 1 is used is adapted.

FIG. 6 is a chart showing a state where the sea clutter suppression effect obtained when the radar apparatus 1 of this embodiment is used is adapted. In FIG. 6, the horizontal axis indicates positions in the distance direction, and the vertical axis indicates the detection data values.

As shown in the characteristic $EC(ø_{ini})$ indicated by the thin solid line, with the initial angular difference $ø_{ini}$, when the echoes of the sea surface reflections (sea clutter) are not effectively suppressed, the detection data values entirely increase and the average value thereof is high. In this case, an echo of a small target object (ship) existing in a sea surface reflection area is buried in the sea surface reflection echo and cannot be detected in most cases.

As the adaption of the angular difference ø proceeds, with an angular difference $ø_{ad1}$, as shown in the characteristic $EC(ø_{ad1})$ indicated by the dotted line, the sea surface reflection echo is more suppressed compared to the initial angular difference $ø_{ini}$. Here, the echo of the small target object (ship) is mostly not suppressed due to the effect of the scan correlation.

As the adaption of the angular difference ø further proceeds, with an angular difference $ø_{ad2}$, as shown in the characteristic $EC(ø_{ad2})$ indicated by the broken line, the sea surface reflection echo is more suppressed compared to the initial angular difference $ø_{ini}$ and the angular difference $ø_{ad1}$. Also in this case, the echo of the small target object (ship) is mostly not suppressed due to the effect of the scan correlation.

Moreover, when the angular difference ø reaches the maximum effect angular difference $ø_{max}$, as shown in the characteristic $EC(ø_{max})$ indicated by the thick solid line, the sea surface reflection echo is greatly suppressed. Here, the echo of the small target object (ship) is mostly not suppressed due to the effect of the scan correlation.

Note that, if the angular difference ø is adapted to at the maximum effect angular difference $ø_{max}$ constantly, the suppression effect of the sea clutter can be kept at maximum level. However, the behavior of the sea clutter constantly changes according to the situation. Therefore, there may be a case where the adapting speed of the angular difference ø cannot follow the changing speed of the behavior of the sea clutter.

However, as shown in FIG. 6, when the adaptation of the angular difference proceeds to some extent, in other words, when the angular difference ø is close to the maximum effect angular difference $ø_{max}$ to some extent, the sea clutter are suppressed, and the small target object can be detected among the sea clutter. Therefore, even if the behavior of the sea clutter constantly change, by using the configuration and processing of this embodiment, practically sufficient clutter suppression effect can be obtained.

Figure 7:
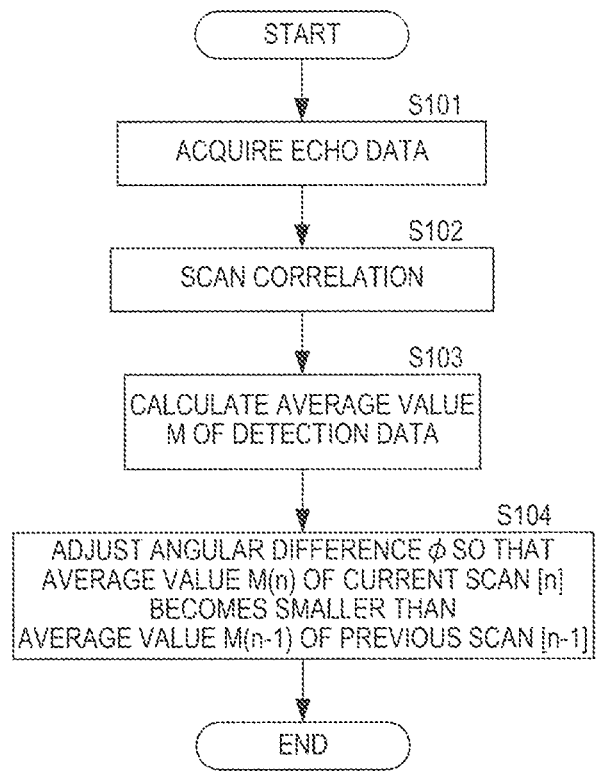
FIG. 7 is a flowchart showing setting processing of the angular difference ø according to the first embodiment.

Note that, the setting processing of the angular difference ø described above may be achieved by being programmed using an information processing device (e.g., computer), and performing the program by the information processing device. FIG. 7 is a flowchart showing the setting processing of the angular difference ø according to this embodiment.

First, the echo data of the first detection pulse signal from the first antenna 101 and the echo data of the second detection pulse signal from the second antenna 102 are acquired (S101). Next, the scan correlation is performed on the acquired echo data as described above, and the detection data is generated (S102). Next, the average value M of the data values of the detection data included in the area DomRd corresponding to the predetermined azimuth range is calculated (S103).

Next, the average value M(n) of the current scan [n] is compared with the average value M(n−1) of the previous scan [n−1] to set the angular difference ø. More specifically, the angular difference ø is adjusted so that the average value M(n) of the current scan [n] becomes smaller than the average value M(n−1) of the previous scan [n−1] (S104).

By this processing, the angular difference ø is adapted to the maximum effect angular difference $ø_{max}$, and thus, the echoes of the sea clutter can effectively be suppressed.

Figure 8:
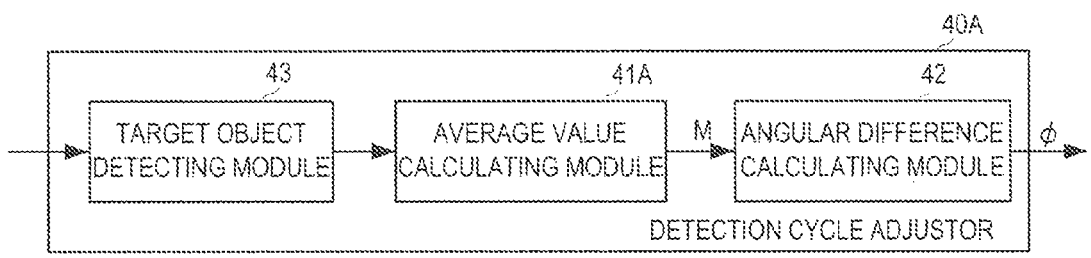
FIG. 8 is a block diagram showing a configuration of a detection cycle adjuster 40A of a radar apparatus according to a second embodiment of the invention.

Next, a radar apparatus according to a second embodiment is described with reference to the appended drawings. The radar apparatus of this embodiment is different from the radar apparatus 1 of the first embodiment in the detection cycle adjuster 40A having a different configuration and performing different processing from those of the first embodiment, and other configuration is the same as the first embodiment. Therefore, only the part that is different is described. FIG. 8 is a block diagram showing a configuration of the detection cycle adjuster 40A of the radar apparatus according to the second embodiment of the invention.

The detection cycle adjuster 40A includes a target object detecting module 43, an average value calculating module 41A, and an angular difference calculating module 42.

The target object detecting module 43 detects an area where the target object exists based on the detection data value. For example, the target object detecting module 43 sets a target object detection threshold for the detection data value, and determines the detection data having the data value exceeding the threshold to be the detection data of the target object echo. The target object detecting module 43 sets a perimeter area DomTr including the position corresponding to the detection data of the target object echo, and outputs it to the average value calculating module 41A.

Figure 9:
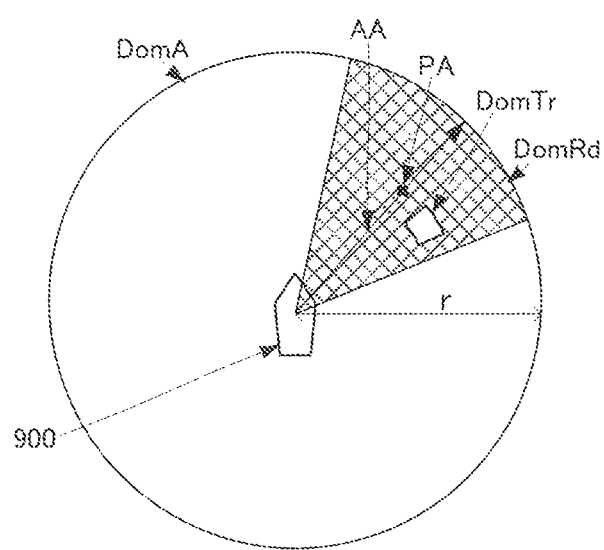
FIG. 9 is a view showing a concept for calculating an average value according to the second embodiment.

The average value calculating module 41A calculates an average value M of the detection data values in a predetermined area including an observing azimuth AA in which an observing position PA exits. Here, the average value calculating module 41A calculates the average value M, excluding the detection data of the perimeter area DomTr of the target object specified by the target object detecting module 43. FIG. 9 is a view showing a concept for calculating the average value according to the second embodiment.

The radar apparatus is equipped in a ship 900, and the first and second antennas 101 and 102 transmit the first and second detection pulse signals while rotating in the horizontal plane, respectively. Here, a circular area DomA having a radius r centering on the ship 900 is set. Moreover, an area DomRd corresponding to a predetermined azimuth range including the observing azimuth AA in which the observing position PA exits is set in the area DomA extending around the entire circumference. Note that, this setting of the area DomRd is merely an example and may suitably be set. The area DomA may be a target area for calculating the average value.

The average value calculating module 41A calculates the average value M of the detection data values relevant to the area DomRd other than the perimeter area DomTr. The average value calculating module 41A calculates the average value M at a predetermined timing interval. For example, the average value calculating module 41A calculates the average value M every time one of the antennas crosses a predetermined azimuth in the area DomRd. Moreover, the average value calculating module 41A calculates the average value M every time the stored detection data corresponding to the entire area DomRd is updated, for example.

The angular difference calculating module 42 sets an angular difference ø based on the average value M outputted from the average value calculating module 41A, similarly to the first embodiment.

By using the configuration and processing of this embodiment, the influence on the data value of the target object echo by the average value used in calculating the angular difference ø can be eliminated. Thus, the average value of the detection data values of clutter echoes can be calculated more accurately and the suppression effect of clutter can be determined more accurately.

Note that, in the above described description, the structure for mechanically operating each antenna to change the transmission azimuth of the detection pulse signal is described; however, a structure for changing the transmission azimuth by a beam control may be used. In this case, instead of using the angular difference, a transmission timing difference between the detection pulse signals to an observing azimuth or an observing position may be directly adjusted.

Additionally, in the above description, the case of using the two antennas is described; however, the above configuration and processing can also be applied to a case of using three or more antennas.

Additionally, in the above description, the example in which the angular difference between the antennas is adjusted because the plurality of antennas are used is described; however, when only one antenna is used, by adjusting a rotational speed (rotational cycle Ts) of the antenna, similar operations and effects as above can be obtained.

Figure 10:
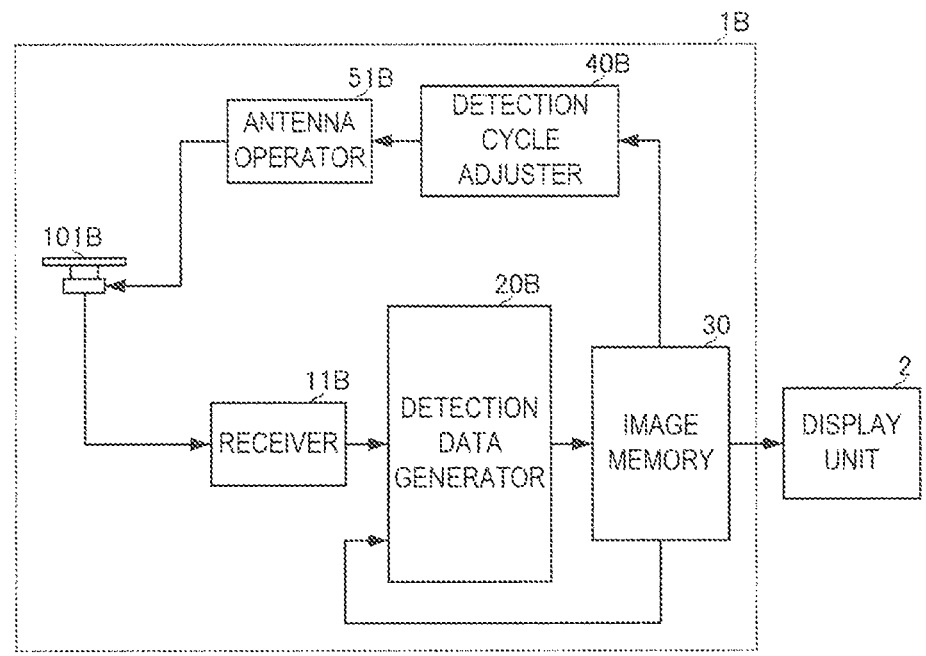
FIG. 10 is a block diagram showing a configuration of a radar apparatus 1B with a single antenna.

FIG. 10 is a block diagram showing a configuration of a radar apparatus 1B with a single antenna.

The radar apparatus 1B includes an antenna 101, a receiver 11B, a detection data generator 20B, an image memory 30, a detection cycle adjuster 40B, and an antenna operator 51B.

The configurations and processing of the antenna 101B and the receiver 11B are the same as those of the first antenna 101 and the first receiver 11B in the above embodiment. The image memory 30 is also the same as the image memory 30 described in the above embodiment.

The detection data generator 20B performs a scan correlation using echo data of sweep data inputted sequentially from the receiver 11B, and detection data which is obtained from a previously performed scan correlation and is stored in the image memory 30. Thus, the detection data generator 20B generates current detection data.

The detection cycle adjuster 40B reads out the detection data from the image memory 30 and adjusts the rotational cycle Ts of the antenna 101B. The detection cycle adjuster 40B outputs the rotational speed adjusting signal according to the adjusted rotational cycle Ts to the antenna operator 51B.

The antenna operator 51B adjusts the rotational speed $V_{ANT}$ based on the rotational speed adjusting signal. Thus, the cycle of the scan correlation is adjusted.

Figure 11:
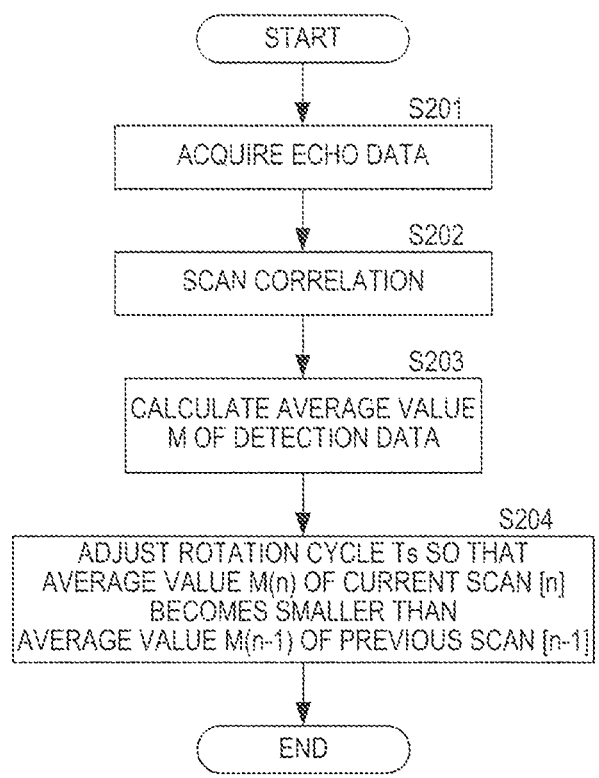
FIG. 11 is a flowchart showing setting processing of a rotational cycle Ts.

Note that, similarly to the above embodiment, the setting processing of such a rotational cycle Ts may be achieved by being programmed using an information processing device (e.g., computer), and performing the program by the information processing device. FIG. 11 is a flowchart showing the setting processing of the rotational cycle Ts according to this embodiment.

First, the echo data of the detection pulse signal from the antenna 101B is acquired (S201). Next, the scan correlation is performed on the acquired echo data as described above, and the detection data is generated (S202). Next, the average value M of the data values of the detection data included in the area DomRd corresponding to the predetermined azimuth range is calculated (S203).

Next, the average value M(n) of the current scan [n] is compared with the average value M(n−1) of the previous scan [n−1] to set the rotational cycle Ts. More specifically, the rotational cycle Ts is adjusted so that the average value M(n) of the current scan [n] becomes smaller than the average value M(n−1) of the previous scan [n−1] (S204).

By this processing, the rotational cycle Ts is adapted to a rotational cycle with which the effect of the scan correlation is maximally exerted, and thus, the echoes of the sea clutter can effectively be suppressed.

Note that, the computer of the claims includes the target object detection device of the present invention, the antenna unit of the present invention, or any hardware that transmits a detection signal in an observing direction at a predetermined detection cycle, receives a reflection signal of the detection signal, and outputs reception data obtained by sampling the reception signal. The computer may be configured to read computer readable media that stores a computer executable program in a non-transitory manner, which upon execution by a processor of the computer causes the computer to perform target detection. The target detection may comprise causing the computer to perform a procedure to transmit a detection signal in an observing direction at a predetermined detection cycle, receive a reflection signal of the detection signal, and output reception data obtained by sampling the reception signal, causing the computer to output detection data obtained by correlating current reception data with previous detection data, and causing the computer to adjust the detection cycle based on the detection data.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A target object detection device, comprising:
an antenna unit configured to transmit a detection signal in an observing direction at a predetermined detection cycle and receive a reflection signal of the detection signal;
a receiver configured to output reception data obtained by sampling the reception signal that is received by the antenna unit;
a detection data generator configured to output detection data obtained by correlating current reception data with previous detection data; and
a detection cycle adjuster configured to adjust the detection cycle based on the detection data;
wherein the detection cycle adjuster adjusts the detection cycle based on a comparison between first detection data obtained by transmitting the detection signal at a first detection cycle, and second detection data obtained by transmitting the detection signal at a second detection cycle that is different from the first detection cycle.

2. The target object device of claim 1, wherein the antenna unit includes a single rotary antenna configured to transmit the detection signals while rotating its directivity axis at a predetermined rotation cycle, the detection signal being transmitted in a direction of the directivity axis, and
wherein the detection cycle adjuster adjusts the detection cycle by adjusting the rotation cycle of the rotary antenna.

3. The target object device of claim 1, wherein the antenna unit includes first and second rotary antennas configured to transmit the detection signals while rotating their directivity axes at the same rotation cycle, the detection signal being transmitted in a direction of the directivity axis,
wherein the detection data generator generates the detection data based on the reception data from the first and second antennas, and
wherein the detection cycle adjuster adjusts the detection cycle by adjusting an angular difference between the directivity axis of the first antenna and the directivity axis of the second antenna based on the detection data.

4. The target object device of claim 1, wherein the detection cycle adjuster calculates an average value of the detection data of a predetermined area containing an observing position for a first detection cycle and a second detection cycle, respectively, and the detection cycle adjuster adjusts the detection cycle based on a difference between the average value of the first detection cycle and the average value of the second detection cycle.

5. The target object device of claim 4, wherein the detection cycle adjuster detects a target object based on values of the detection data, and when the target object is within the predetermined area, the detection cycle adjuster adjusts the detection cycle based on values of the detection data of the predetermined area other than a target object area having a predetermined size containing the target object.

6. A radar apparatus comprising the target object detection device of claim 1, the detection signal being a radio wave signal.

7. A method of detecting a target object, comprising:
transmitting a detection signal in an observing direction at a predetermined detection cycle, receiving a reflection signal of the detection signal, and outputting reception data obtained by sampling the reception signal;
outputting detection data obtained by correlating current reception data with previous detection data; and
adjusting the detection cycle based on the detection data;
wherein the adjusting the detection cycle includes adjusting the detection cycle based on a comparison between first detection data obtained by transmitting the detection signal at a first detection cycle, and second detection data obtained by transmitting the detection signal at a second detection cycle that is different from the first detection cycle.

8. The method of claim 7, wherein the transmitting the detection signal includes transmitting the detection signals from a single rotary antenna such that the rotary antenna rotates its directivity axis at a predetermined rotation cycle, the detection signal being transmitted in a direction of the directivity axis, and
wherein the adjusting the detection cycle includes adjusting the detection cycle by adjusting the rotation cycle of the rotary antenna.

9. The method of claim 7, wherein the transmitting the detection signal includes transmitting the detection signals from first and second rotary antennas such that the antennas rotate their directivity axes at the same rotation cycle, the detection signal being transmitted in a direction of the directivity axis,
wherein the outputting the data includes generating the detection data based on the reception data from the first and second antennas, and
wherein the adjusting the detection cycle includes adjusting the detection cycle by adjusting an angular difference between the directivity axis of the first antenna and the directivity axis of the second antenna based on the detection data.

10. The method of claim 7, wherein the adjusting the detection cycle includes calculating an average value of the detection data of a predetermined area containing an observing position for a first detection cycle and a second detection cycle, respectively, and the adjusting the detection cycle includes adjusting the detection cycle based on a difference between an average value of the first detection cycle and an average value of the second detection cycle.

11. The method of claim 10, wherein the adjusting the detection cycle includes detecting a target object based on values of the detection data, and when the target object is within the predetermined area, adjusting the detection cycle based on values of the detection data of the predetermined area other than a target object area having a predetermined size containing the target object.

12. Computer readable media configured to store a computer executable program in a non-transitory manner, which upon execution by a processor of a computer causes the computer to perform target detection, comprising:
causing a computer to perform a procedure to transmit a detection signal in an observing direction at a predetermined detection cycle, receive a reflection signal of the detection signal, and output reception data obtained by sampling the reception signal;
causing a computer to output detection data obtained by correlating current reception data with previous detection data; and
causing a computer to adjust the detection cycle based on the detection data;
wherein causing the computer to adjust the detection cycle includes adjusting the detection cycle based on a comparison between first detection data obtained by transmitting the detection signal at a first detection cycle, and second detection data obtained by transmitting the detection signal at a second detection cycle that is different from the first detection cycle.

\* \* \* \* \*